United States Patent [19]

Graham

[11] Patent Number: 4,471,711

[45] Date of Patent: Sep. 18, 1984

[54] PUSH-PULL CABLE WITH COLOR CHANGE TEMPERATURE SELF-INDICATING MEANS

[75] Inventor: Dennis I. Graham, Hudson, Ohio

[73] Assignee: Incom International Inc., Pittsburgh, Pa.

[21] Appl. No.: 333,949

[22] Filed: Dec. 23, 1981

[51] Int. Cl.³ .......................... G01K 11/00; H05B 3/10
[52] U.S. Cl. ...................... 116/216; 57/223; 174/103; 374/161
[58] Field of Search ............... 116/278, DIG. 14, 216, 116/217, 219, 212, 208; 374/162, 111, 161, 4; 57/217, 221, 223; 174/103 B, 121 A, 11 R; 356/421, 408; 74/501 M

[56] References Cited

U.S. PATENT DOCUMENTS

| | | | |
|---|---|---|---|
| 642,738 | 2/1900 | Borel | 57/223 X |
| 1,924,793 | 8/1933 | Laske | 116/207 X |
| 2,799,167 | 7/1957 | Loconti | 374/162 |
| 2,809,458 | 10/1957 | Wilbourn | 356/421 X |
| 3,187,080 | 6/1965 | Ball | 174/11 R |
| 3,257,863 | 6/1966 | Hanson | 374/208 X |
| 3,320,665 | 5/1967 | Morse | 74/501 P |
| 3,485,101 | 12/1969 | Lindberg et al. | 374/111 |
| 3,580,079 | 5/1971 | Crites et al. | 374/162 X |
| 3,581,523 | 6/1971 | Bartholomew | 74/501 P X |
| 3,620,889 | 11/1971 | Baltzer | 374/162 X |
| 3,816,335 | 6/1974 | Evans | 174/11 R X |
| 3,847,139 | 11/1974 | Flam | 374/162 X |
| 3,862,349 | 1/1975 | Watts | 174/11 R |
| 4,022,706 | 5/1977 | Davis | 374/162 X |
| 4,246,468 | 1/1981 | Horsma | 219/505 X |
| 4,291,193 | 9/1981 | Stemler et al. | 174/11 R |
| 4,298,794 | 11/1981 | Snitzer et al. | 374/161 X |

FOREIGN PATENT DOCUMENTS

| | | | |
|---|---|---|---|
| 2738253 | 3/1979 | Fed. Rep. of Germany | 374/161 |
| 674273 | 6/1952 | United Kingdom | 174/11 R |

Primary Examiner—Daniel M. Yasich
Attorney, Agent, or Firm—James Crieghton Wray

[57] ABSTRACT

A push-pull cable assembly for use in high temperature environments, particularly for use with engines generating high temperatures in application, has a cable conduit with a natural nylon outer tubular element and a nylon inner tubular element helically wrapped by wires. Nylon 66 is preferred. A chromatic indicator is included in the outer element. Exposure to the elevated temperature environment for a long period of time causes the conduit to change from its original green color to dark brown as failure of the assembly becomes imminent. The cable assembly is replaced when the conduit turns dark tan or brown.

9 Claims, 2 Drawing Figures

FIG.1
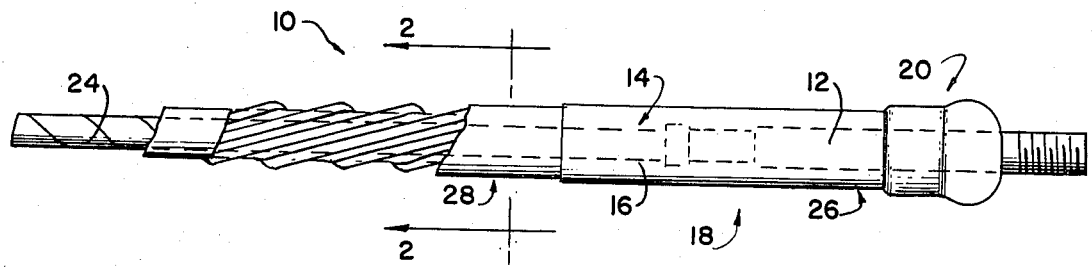
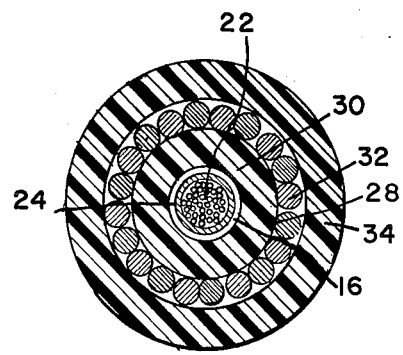
FIG. 2

PUSH-PULL CABLE WITH COLOR CHANGE TEMPERATURE SELF-INDICATING MEANS

BACKGROUND OF THE INVENTION

This invention relates generally to cable assemblies and more particularly has reference to a push-pull cable conduit formed of material which changes color to indicate imminent failure due to exposure to excessive heat.

Pertinent U.S. and foreign patents are found in Class 73, subclass 356; Class 74, subclasses 501 P and Digest 10; Class 116, subclasses 206, 208 and 216; Class 136, subclasses 36 and 125 and Class 528, subclass 335 of the official classifications of patents in the U.S. Patent and Trademark Office.

Examples of the most pertinent U.S. patents are U.S. Pat. Nos. 3,581,523, 3,416,389, 3,528,312, 3,373,632, 3,516,299, 3,320,665.

The patents show push-pull cables formed of plastic material. However, none of the patents discloses a self-indicating push-pull cable that changes jacket color when failure due to excessive heat is imminent.

Push-pull cables are often used in high temperature environments. Many attempts have been made to produce cable conduits capable of withstanding high temperature, but none has been completely successful. All known cable conduits fail after long use at high temperature.

Unexpected or untimely failure of the cable conduit is a serious problem because it causes excessive down time for the machinery in which the cable is used. Because it is easy to replace a cable assembly before failure during normal maintenance, persons skilled in the art have long sought an apparatus or method for predicting a cable failure of the assembly. However, the problem of unexpected cable failure due to exposure to excessive heat has heretofore remained unsolved.

SUMMARY OF THE INVENTION

The present invention overcomes the problems which exist in the prior art and provides an apparatus and method for predicting heat failure of cable assemblies.

The present invention provides a cable conduit having an exposed surface formed of material which changes color to indicate failure due to exposure to excessive heat. The preferred material is a natural nylon resin including a chromatic indicator additive. The material is originally a light green color, but changes to tan and then to dark brown when it is exposed to an elevated temperature environment for a relatively long period of time. A dark brown color indicates that failure is imminent and that the cable assembly should be replaced.

Objects of the invention are, therefore, to provide an improved cable assembly and to provide a cable assembly having a conduit with self-indicating means for providing the user with an indication of when to replace the assembly before catastrophic failure.

Another object of the invention is to provide a cable conduit which changes color to indicate imminent failure due to excessive heat.

Yet another object of the invention is to provide a cable conduit which undergoes a predictable sequence of color changes when exposed to an elevated temperature environment over a period of time.

A further object of the invention is to provide a method for preventing unexpected failure of a cable assembly exposed to an elevated temperature environment comprising providing a cable conduit with an exposed surface formed of material which changes color to indicate imminent failure, observing the color of the surface, comparing the observed color to the known color of the material indicative of imminent failure, and replacing the cable assembly when the observed color is substantially identical to the said known color.

These and other and further objects and features of the invention are apparent in the disclosure which includes the above and below specification and claims and drawings.

BRIEF DESCRIPTION OF THE DRAWINGS

FIG. 1 is a side elevational view, partially broken away, showing an end of a push-pull cable assembly embodying features of the present invention.

FIG. 2 is a sectional view taken along the line 2—2 in FIG. 1.

DETAILED DESCRIPTION OF THE INVENTION

Referring to FIG. 1, a push-pull cable assembly embodying features of the present invention is generally indicated by the numeral 10.

A rigid cable rod 12 is crimped to the end of a flexible push-pull cable core 14 and used to communicate axial actuating forces to the cable core 14. The rod 12 and cable core 14 are slidably mounted in an axial opening 16 formed in a cable conduit 18. An elastomeric seal 20 mounted on the end of the cable conduit 18 sealingly engages the cable rod 12 to prevent entry of destructive material into the axial opening 16 of the conduit 18.

The push-pull cable cable core 14 is formed of a plurality of wire strands 22 helically wrapped by a flat wire 24. The wire strands are best shown in FIG. 2.

The cable conduit 18 has a rigid portion 26 connected to the end of a flexible portion 28, with which may extend to another rigid portion at an opposite end.

As is well known, push-pull cable assemblies have a wide variety of applications and the present invention can be used for any of those applications. However, the present invention is particularly useful in those applications which involve an elevated temperature environment. For example, push-pull cable assemblies have long been used in controls for engines of large off-road vehicles. Such high temperature engines are typically 8.2 liter diesel engines which raise their environment to a temperature of about 300° F. (150° C.) when in operation. Such an environment is capable of deteriorating a push-pull cable assembly over a period of time so that the assembly eventually fails. The present invention provides a particularly useful and effective means for predicting failure of push-pull cable assemblies used in that environment prior to heat failure.

The flexible portion 28 of the cable conduit 18 is best shown in FIG. 2.

The axial opening 16 is provided in an inner conduit portion 30. The inner conduit portion 30 can be formed of any material which provides a suitable sliding surface for the push-pull cable core 14. The material should also be sufficiently hard or rigid to be wear resistant. The preferred material for the inner conduit portion 30 is a nylon resin, preferably a natural nylon 66 resin which has been heat stabilized. Although the present invention contemplates use of any such materials, one material which has proved particularly effective is a material manufactured by DuPont under the designation 42 HS. That material has good heat stability and provides a relatively hard sliding surface for the push-pull cable A plurality of wires 32 are arranged about the outer surface of the inner conduit portion 30. The wires 32 can be round wires as shown in the figures, or can be flat wires, as desired. Moreover, the wires 32 can be helically wrapped about the inner conduit portion 30 as shown in the figures or can be arranged in longitudinally extending strands, as desired. Preferably, the wires 32 are oil tempered wires which are helically wrapped about the outer surface of the inner conduit portion 30.

In FIG. 2, an outer conduit portion containing a chromatic indicator additive 34 is disposed about the wires 32 to form the outer layer of the flexible portion 28 of the cable conduit 18. The outer conduit portion 34 can be formed of any material which inherently undergoes a predictable sequence of changes in color when heat failure is imminent.

The preferred material for the outer conduit portion 34 is a nylon resin, preferably a nylon 66 resin, including a chromatic indicator additive. The present invention contemplates use of any additives which are capable of producing predictable color changes in the nylon to indicate heat exposure or heat failure.

Plasticizers and heat stabilizers are examples of chromatic indicator additives for nylon. Water is a particularly useful plasticizer. There are many well known heat stabilizers which are traditionally used to extend the time which a material can withstand a high temperature environment. The present invention contemplates use of any heat stabilizers which produce the above described color changes. A product manufactured by DuPont under the designation Zytel 91 HS is a particularly useful heat stabilized nylon. It is believed that the DuPont product includes a haline salt heat stabilizing additive.

A typical data sheet for nylon 66 indicates the following properties:

TYPICAL PROPERTIES

| Property | Units | DAM | 50% RH | ASTM Method |
|---|---|---|---|---|
| Tensile Strength, 73° F. | psi | 7,600 | 6,500 | D-638 |
| Elongation at Break, 73° F. | % | 250 | 300 | D 638 |
| Flexural Modulus, 73° F. | psi | 55,000 | 30,000 | D-790 |
| Izod Impact Strength, −40° F. | ft.lb./in. | 0.3 | | D-256 |
| 73° F. | | 5.0 | NB | |
| Rockwell Hardness | R scale | R75 | R70 | D-785 |
| Specific Gravity | | 1.14 | | D-792 |
| Melting Point | °F. | 390–410 | | Fisher-Johns |

Nylon 66 is particularly suited for use in a flexible conduit, because it is capable of bending without stress cracks. It is understood, however, that other nylons or other materials can be used without departing from the present invention.

The preferred material for the outer conduit is a heat stabilized natural undyed nylon which is originally light green in color due to the heat stabilizer additive. When used in an elevated temperature environment, e.g., an environment temperature relatively close to the melting point of the conduit material, over a long period of time, the material becomes tan in color due to the degradation of the heat stabilizer additive. That color change warns that the conduit material is deteriorating. After about 2000 hours at 300° F., the material turns dark tan to brown, which indicates that failure is imminent.

It is thus readily apparent that the outer conduit portion 34 of the present invention will act as a self-indicating means to warn of imminent failure of the cable assembly. The outer conduit portion 34 should be free of dyes or other foreign colorations which could disguise or adversely affect the self-indicating properties of the material. The preferred heat stabilized nylon material has been used in cable conduits heretofore but it has always been impregnated with a dye which disguises the inherent color changes of the deteriorating material. The applicant was the first to recognize the relationship between those color changes and the deterioration of the material, and was the first to determine the substance responsible for the color changes and to determine equivalent substances, and was the first to recognize that such a material could perform a self-indication function in a cable conduit free of dye. It is clear that substances which have no effect on the self-indicating properties of the material can be applied to the outer conduit portion 34 without defeating the object of the present invention.

In use, an operator, repairman, or inspector would periodically observe the color of the cable conduit 18 and compare that color to the known colors indicative of heat deterioration and failure of the conduit material. In the case of a conduit formed of the preferred heat stabilized natural nylon material, the color of the conduit 18 could be compared to the known tan and dark brown colors of the material. Prudent maintenance procedures would dictate replacement of the cable assembly when the conduit was colored tan or some darker shade. A dark brown conduit would indicate that immediate replacement is required.

Although the present invention has been discussed in relation to push-pull cable assemblies, it is readily apparent that the present invention is not limited to push-pull cables. The basic concepts of the present invention are applicable in any situation where a device is subjected to the deteriorating effects of an elevated temperature environment.

While the invention has been described with reference to a specific embodiment, the exact nature and scope of the invention is defined in the following claims.

I claim:

1. A cable conduit with self-indicating means for a cable assembly in an elevated temperature environment comprising a tubular element means including a spaced inner conduit element having an axial passageway therethrough for slidably receiving a cable, said tubular element having a visible portion formed of material incorporated therein which changes color to indicate heat deterioration and imminent failure, the material comprising natural nylon resin including a chromatic indicator additive, the resin being substantially undyed, the nylon resin comprising nylon 66 resin, the chromatic indicator additive comprising a plasticizer and heat stabilizing additive.

2. The apparatus of claim 1 wherein said material undergoes a predictable sequence of color changes when exposed to the elevated temperature environment over a period of time.

3. The apparatus of claim 1 wherein said material undergoes a predictable sequence of slow color changes when exposed to the elevated temperature environment over a relatively long period of time.

4. The apparatus of claim 1 wherein said tubular element means comprises the inner tubular conduit element having an axial passageway therethrough for slidably receiving the cable, an outer tubular element formed of said material concentrically disposed about said inner tubular element, and a plurality of wires disposed between the inner and outer tubular element and helically wrapped about the outer surface of the inner tubular element.

5. The apparatus of claim 4 wherein the inner tubular element is formed of nylon and the outer tubular element is formed of natural nylon resin including a chromatic indicator additive.

6. The apparatus of claim 5 wherein the additive is a heat stabilizer and the nylon resin is substantially undyed.

7. A method for preventing unexpected failure of a cable push-pull assembly exposed to an elevated temperature environment comprising
providing a spaced cable conduit of the cable assembly with a visible outer portion formed of material which changes color to indicate heat deterioration and imminent failure, the material comprising natural nylon resin including a chromatic indicator additive, the additive comprising a heat stabilizer.

8. The method of claim 7 wherein said resin is substantially undyed.

9. A push-pull cable assembly having a flexible push-pull cable core slidably mounted in a cable conduit having a flexible portion, the flexible portion having an outer layer with a visible outer surface, means in the outer layer and visible in the surface for changing color upon exposure to a predetermined heat range for a predetermined period of time, the means for changing color including a plastic material from which the outer conduit portion is constructed, the plastic material comprising a nylon resin having heat stabilizer additive being a haline salt heat stabilizing additive comprising means for causing a color change visible in the outer surface from light green to tan to dark brown upon exposure of the cable assembly to an environment for a predetermined temperature range of about 300° F.

* * * * *